US006888315B1

(12) United States Patent
Hsiao

(10) Patent No.: US 6,888,315 B1
(45) Date of Patent: May 3, 2005

(54) WIRELESS NETWORK LAMP

(76) Inventor: Po-Sen Hsiao, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 10/704,699

(22) Filed: Nov. 12, 2003

(51) Int. Cl.[7] .......................... H05B 37/02; H01J 31/00
(52) U.S. Cl. ..................... 315/149; 315/316; 315/56; 362/367; 362/362; 362/33
(58) Field of Search ........................ 315/149, 150–159, 315/56–59, 316; 362/367, 362, 4, 33, 31

(56) References Cited

U.S. PATENT DOCUMENTS

| | | | | |
|---|---|---|---|---|
| 5,605,506 A | * | 2/1997 | Hoorn et al. ................. | 463/42 |
| 6,791,284 B1 | * | 9/2004 | Levy ........................... | 315/292 |
| 2003/0228553 A1 | * | 12/2003 | Mandelkern et al. ......... | 433/29 |
| 2004/0012344 A1 | * | 1/2004 | Bibi ............................. | 315/291 |
| 2004/0192475 A1 | * | 9/2004 | Newton ....................... | 473/478 |

* cited by examiner

Primary Examiner—Tuyet Thi Vo

(57) ABSTRACT

A lamp, comprising a base of the lamp configured with a wireless transmission component. The wireless transmission component is adapted to having an electric circuit enabled to implement wireless signal reception\transmission. A power cord is connected to a power supply circuit of the electric circuit. An aerial circuit of the electric circuit is connected to a metal stand of the lamp or to a metal frame of a lampshade, therewith enabling a connection to be made between a signal transmission port of the wireless transmission component and wired network equipment. Furthermore, the lamp is structured such to implement wireless signal transmission through linking the wireless transmission component with equipment having a wireless network card.

3 Claims, 5 Drawing Sheets

WIRELESS NETWORK LAMP

BACKGROUND OF THE INVENTION (a) Field of the Invention

The present invention relates to lamps, and more particularly to a lamp structured to provide a base platform with functionality for transmitting a wireless signal, enabling the lamp to implement wireless signal transmission to equipment having a wireless network card by means of the lamp and wired network equipment. Furthermore, a metal stand of the lamp or a metal frame of a lampshade can extend extent of reception area of an aerial circuit to a better signal reception position.

(b) Description of the Prior Art

In recent years wireless networks have become a topic of hot issue. Network communications technology has gradually moved away from wired type structural frameworks, and through a wireless network everybody can easily acquire instant information by utilizing devices such as a mobile phone, a personal digital assistant, a notebook computer, etc. Therefore, informational electrical appliances are an important area of operations for wireless transmission. Current wireless network communication protocols include those proposed by HomeRF (SWAP) including Bluetooth and HomeRF Working Group, and Wireless Fidelity (Wi-Fi), the wireless network communication protocol.

As a result of aforementioned wireless network communication protocols different baud rates and transmission ranges are severally suitable as primary application areas for home or business, and regardless whether the application area of the wireless network is a general household or a large business, provision of equipment having a network card frees limitations of a network, whereby wireless transmission can be implemented by means of a wireless transmission method thorough a mini base platform connecting with wired network equipment.

Accordingly, in an environment implementing wireless network communication, a mini base platform constitutes an indispensable relay device utilized to connect wired network equipment and a wireless network card. The mini base platform directly effects efficiency of signal transmission\reception. Therefore, a majority of conventional mini base devices have installed a fixed length extended aerial on a body of the device in order to enhance reception effectiveness of a wireless signal. However, obstruction of peripheral equipment results when an aerial extension protruding from the mini base platform is too long, and too short an aerial length is incapable of normal signal transmission\reception. Particularly, in a realistic environment, difficulties arise in locating a suitable location to place the mini base platform, and results in lower than anticipated operation quality of the wireless network.

SUMMARY OF THE INVENTION

A lamp, comprising a base of the lamp configured with a wireless transmission component. The wireless transmission component having an electric circuit enabled to implement wireless signal reception\transmission. A power cord is connected to a power supply circuit of the electric circuit. An aerial circuit of the electric circuit is connected to a metal stand of the lamp or to a metal frame of a lampshade. A base platform is configured with functionality for transmitting a wireless signal, enabling the lamp to implement wireless signal transmission to equipment having a wireless network card by means of the lamp and wired network equipment. Furthermore, a metal stand of the lamp or a metal frame of a lampshade can extend extent of reception area of an aerial circuit to a better signal reception position.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
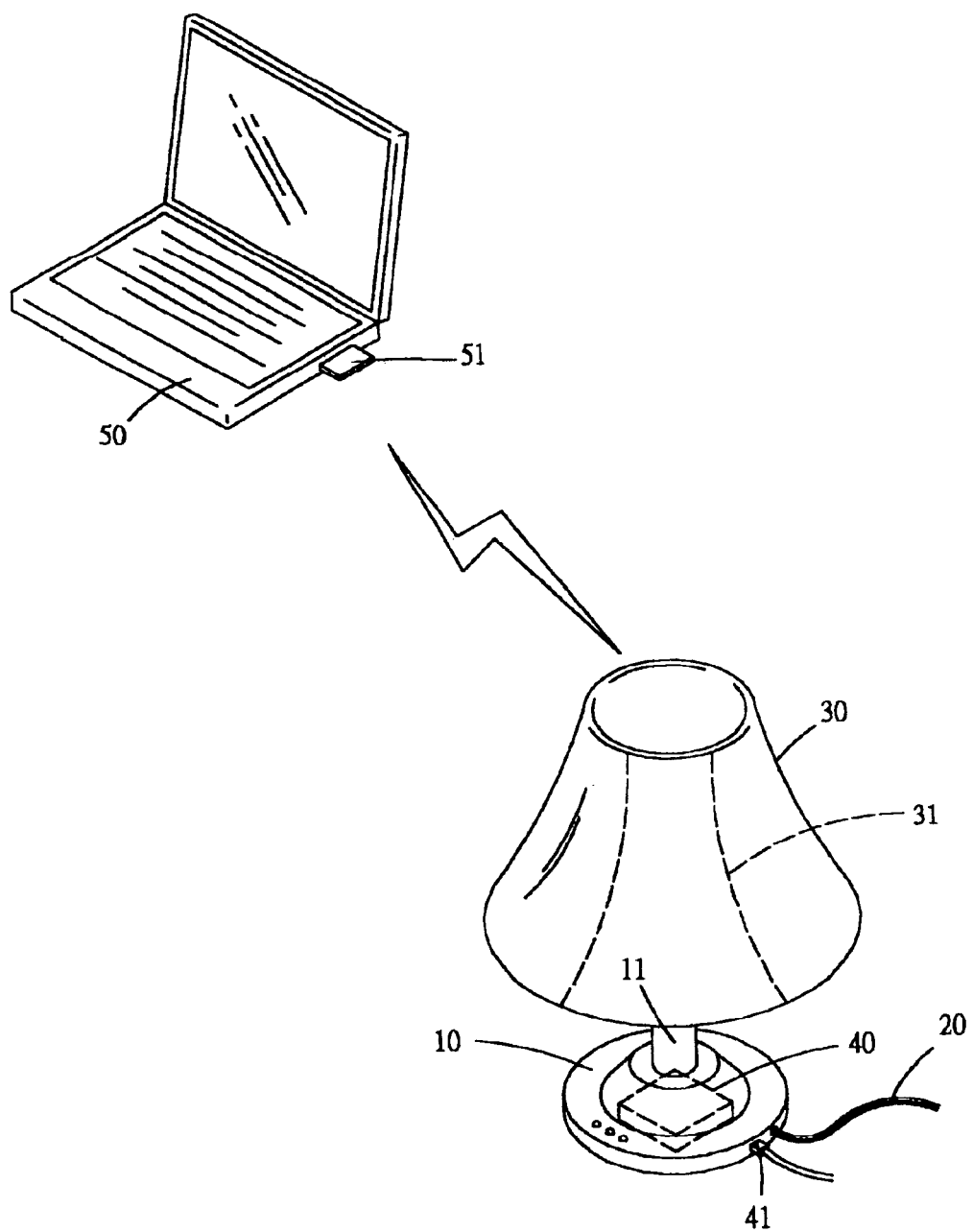
FIG. 1 shows a schematic view of one embodiment of a lamp according to the present invention.

A basic structure of a lamp according to the present invention is depicted in FIG. 1, comprising a base (10), which constitutes a principle body structure of the lamp. Referring to FIG. 1, which shows one embodiment of the present invention, the lamp is designed to be utilized as a desk lamp and placed on a table top, thus, the base (10) is a base support for the desk lamp, thereby stabilizing the lamp when placed on a table top. A stand (11) is configured to the base (10), and utilized to support a lighting component at an applicable height. A power cable (20) is configured to connect to a light bulb and other lighting components. A metal frame (31) is further configured on the stand (11), and utilized to support a lampshade (30) thereof.

A wireless transmission component (40) is configured in the base (10), and utilized to implement an electric circuit enabled for wireless signal reception\transmission. The power cable (20) is connected to a power supply circuit of the electric circuit. An aerial circuit of the electric circuit is connected to the metal frame (31) of the lampshade (30). A signal transmission circuit of the electric circuit is connected to a signal transmission port (41).

Accordingly, the lamp is structured such to enable connection between wired network equipment and the signal transmission port (41) and the wireless transmission component (40) is structured to implement wireless signal transmission with a device (50) having a wireless network card (51). The lamp is further structured to having functionality as a base platform, particularly, the lamp utilizes the metal frame (31) of the lampshade (30) to extend wireless signal reception range, and the stand (11) can extend the extent of the reception area of the aerial circuit to a better signal reception position, thereby not only solving a difficult problem of deployment of base platform, but also improving operation quality of the wireless network.

Figure 2:
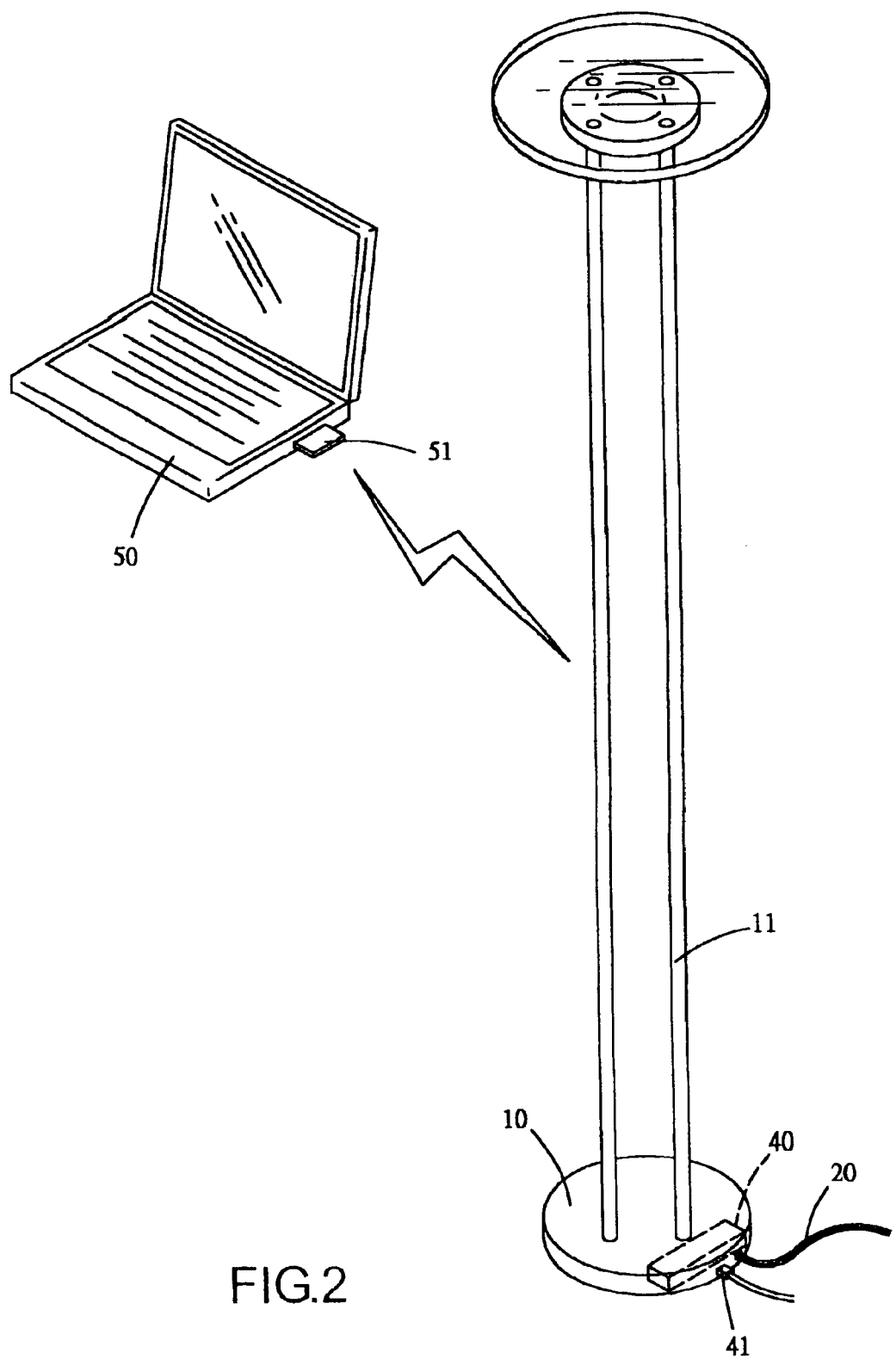
FIG. 2 shows a schematic view of another embodiment of the lamp according to the present invention.

Certainly, the lamp according to the present invention may also be designed as that depicted in FIG. 2. Because the base of a standing lamp per se is configured with a long stand (11), the stand (11) may be manufactured from metallic materials. Connecting the aerial circuit of the electric circuit to the stand (11) thereof provides the stand (11) with functionality to extend the extent of the reception area of wireless signals, as well as extending the extent of the reception area of the aerial circuit to a better signal reception position.

Figure 3:
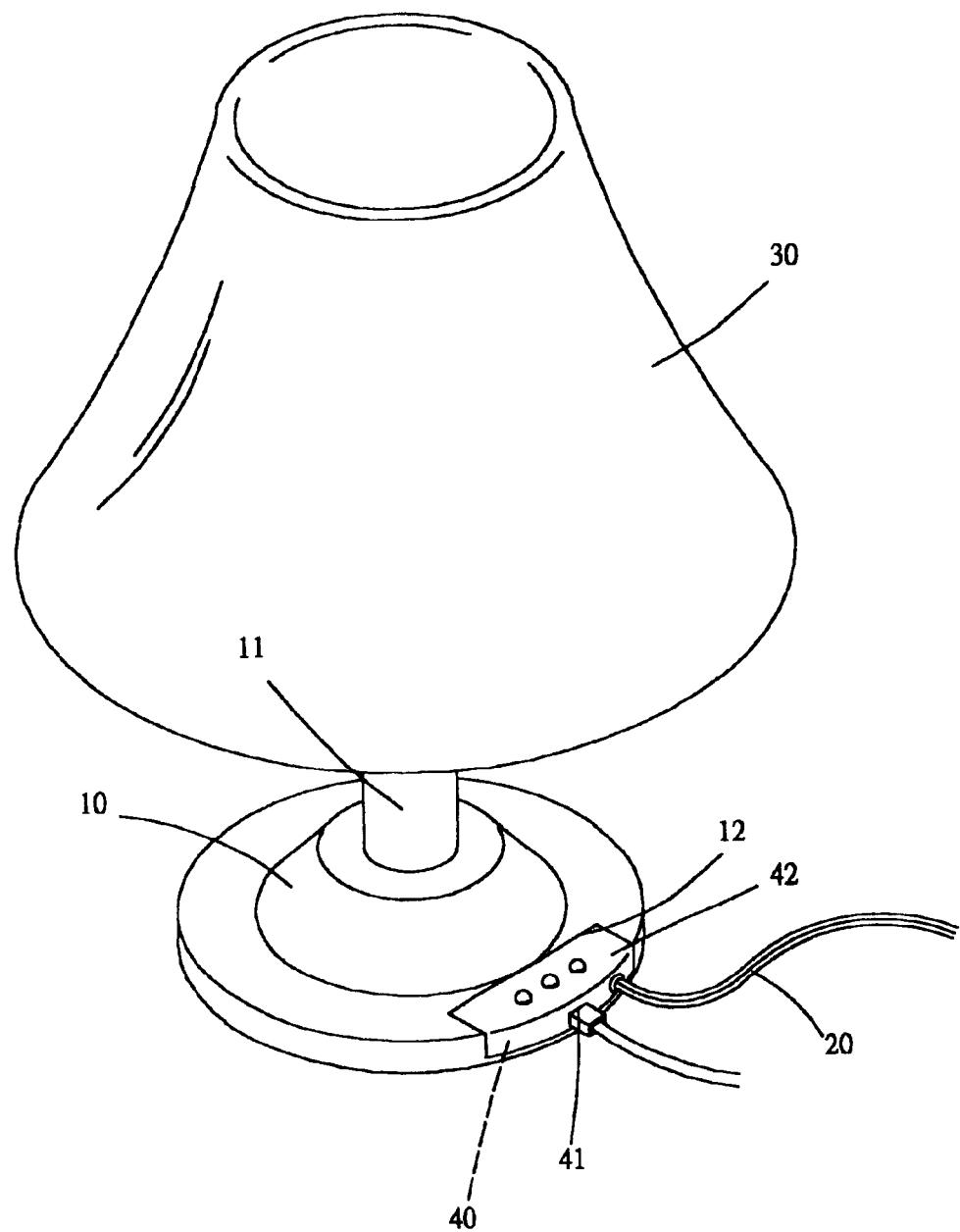
FIG. 3 shows a schematic view of yet another embodiment of the lamp according to the present invention.
Figure 4:
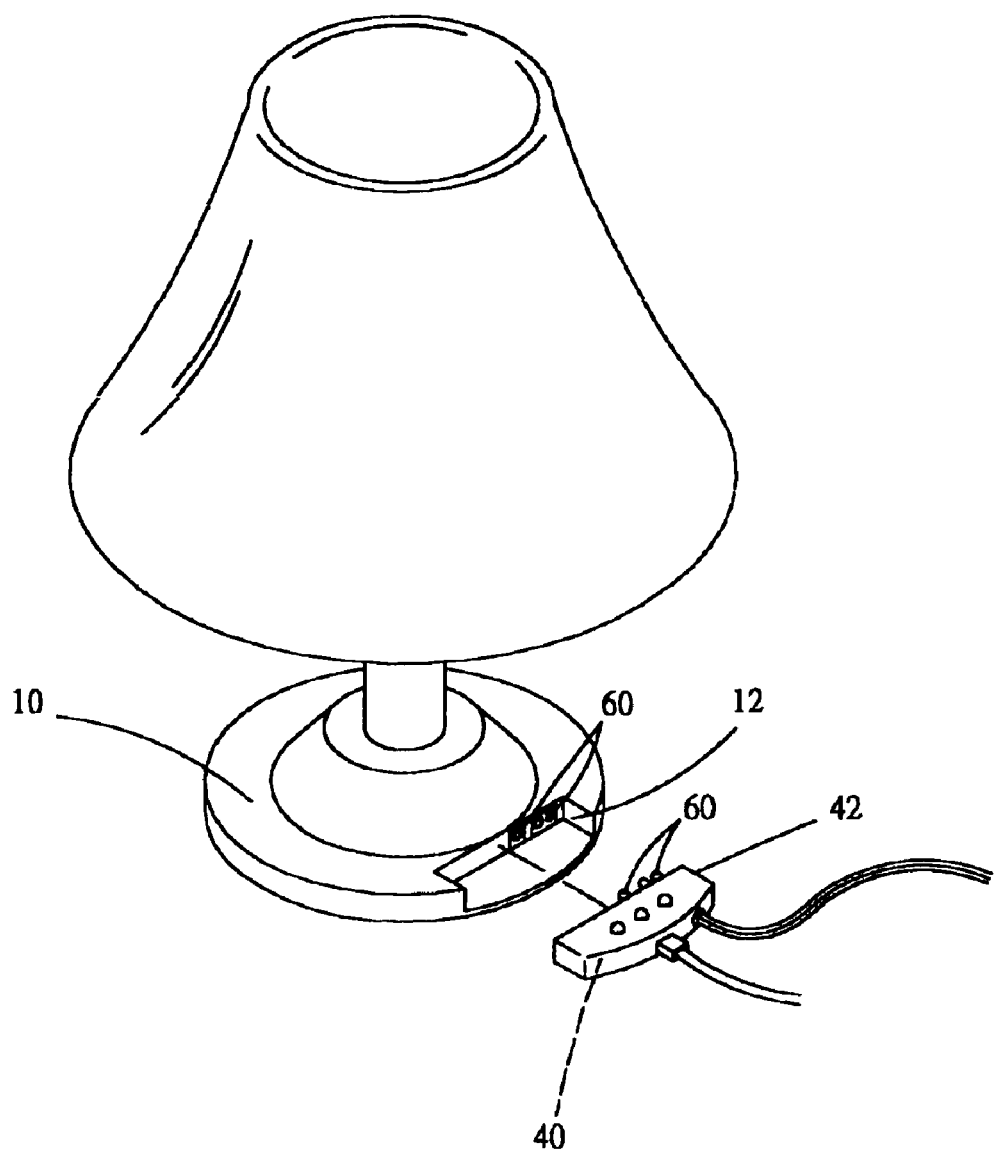
FIG. 4 shows a schematic view of the embodiment as depicted in FIG. 3, with a wireless transmission component pulled away from a base of the lamp according to the present invention.

Furthermore, the lamp, in addition to adapting a design whereby the wireless transmission component (40) is configured within the base (10), a design can be adapted as depicted in FIG. 3, whereby the wireless transmission component (40) is configured within a box (42). The box (42) is configured with the power cable (20), which connects to the power supply circuit of the electric circuit, and the transmission signal port (41) of a signal transmission circuit is directly configured on the box (42). As for the original base (10) having the built-in wireless transmission component (40), the base (10) is adapted to provide a slot (12) for the box (42) to slot into thereof (see FIG. 4). In addition, receptacle connectors (60) are configured in the slot (12) and box (42) respectively. The receptacle connectors (60) are configured such to connect a power supply and wireless signals, enabling the integral wireless transmission component (40) to having functionality to insert into and pull-out of the slot (12) thereof, thereby allowing removal and replacement of the wireless transmission component (40) from the base (10).

Figure 5:
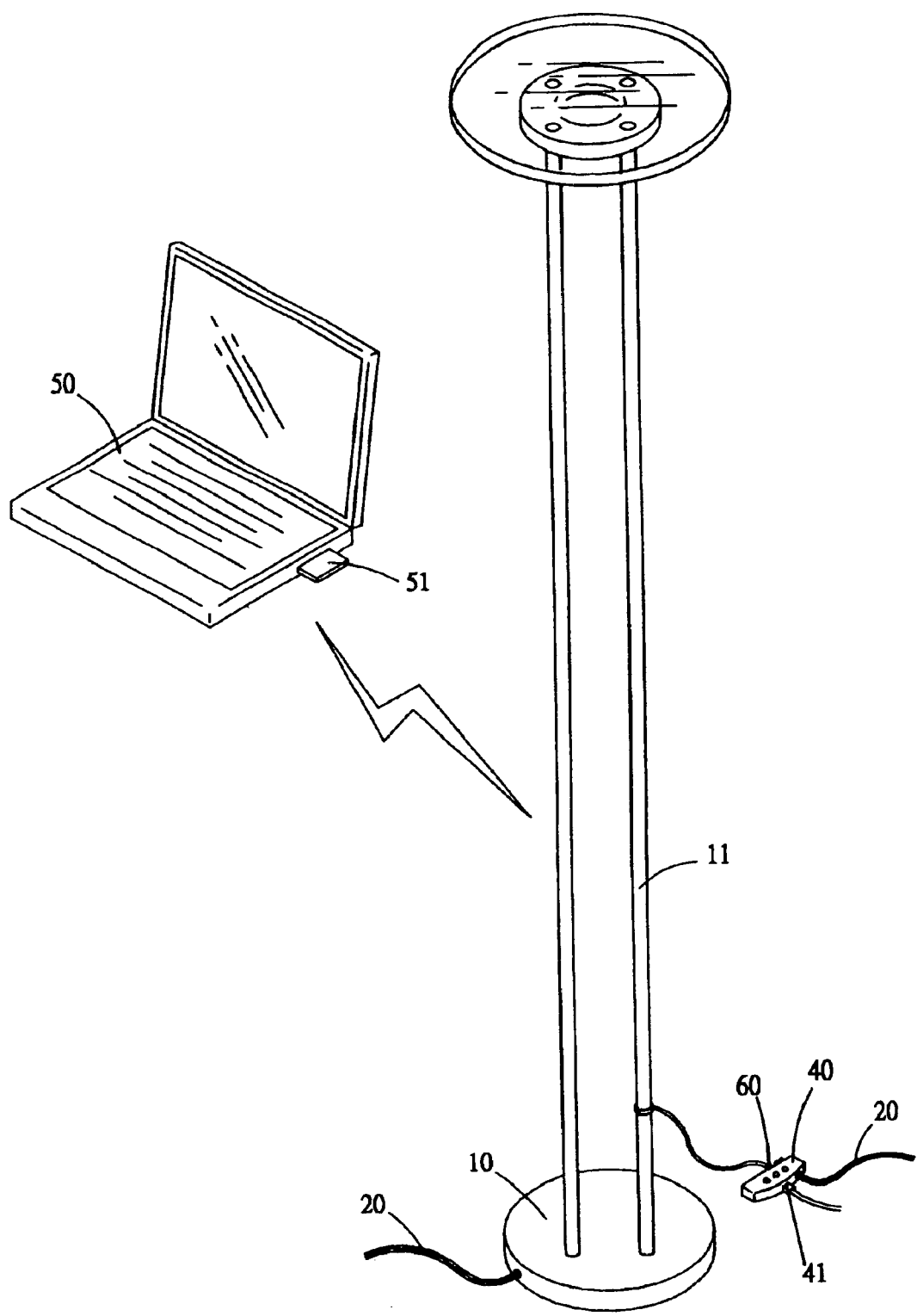
FIG. 5 shows a schematic view of a further embodiment of the lamp according to the present invention.

Referring to FIG. 5, which shows the connectors (60) and box (42) directly connected to the stand (11), which is manufactured from a metallic material, (and other principle metallic portions of the lamp), and thereby achieves enabling optionally changing relay positioning of wireless signals.

As abovesaid, the lamp according to the present invention is a lamp structure providing functionality as a wireless signal base platform, and resolves a difficult problem of deployment of the base platform, and effectively improves operation quality of the wireless network. Accordingly, hereby is proposed a new model and patent application is submitted hereof.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A wireless network lamp, comprising:

a base, which constitutes a principle body structure of the lamp;

a stand is configured to the base, and utilized to support a lighting component at an applicable height;

a metal frame is further configured on the stand, and utilized to supported a lampshade thereof;

a wireless transmission component, which is configured in the base, and utilized to implement an electric circuit for wireless signal reception/transmission; and a power supply circuit of the electric circuit is connected to a power cable thereof, an aerial circuit of the electric circuit is connected to a metal frame of the lampshade, and a signal transmission circuit of the electric circuit is connected to a signal transmission port;

wherein the lamp is structured between wired network equipment and the signal transmission port such to enable connection and through the wireless transmission component structured to transmission with a device having implement wireless signal wireless network card, the lamp utilizes a metal frame of the lampshade to extend extent of wireless signal reception range, and the stand can extend the extent of the reception area of the aerial circuit to a better signal reception position.

2. The lamp as claimed in claim 1, wherein the wireless transmission component is configured within a box, and the box is configured with a power cable, which connects to the power supply circuit of the electric circuit, and the transmission signal port of the signal transmission circuit is directly configured on the box; the base is adapted to provide a slot for the box to slot into thereof; in addition, receptacle connectors are configured in the slot and box respectively, the receptacle connectors are configured such to connect a power supply and wireless signals, enabling the integral wireless transmission component to having functionality to insert into and pull-out of the slot thereof.

3. A wireless network lamp, comprising:

a base, which constitutes a principle body structure of the lamp;

a metal stand is configured to the base, and utilized to support a lighting component at an applicable height;

a power cable is configured to connect to the lighting component thereof;

a wireless transmission component, which is configured in the base, and utilized to implement an electric circuit for wireless signal reception/transmission;

a power supply circuit of the electric circuit is connected to a power cable thereof; and an aerial circuit of the electric circuit is connected to a stand, and a signal transmission circuit of the electric circuit is connected to a signal transmission port;

wherein the lamp is structured such to enable connection between wired network equipment and the signal transmission port and through the wireless transmission component structured to implement wireless signal transmission with a device having a wireless network card, the lamp utilizes a stand to extend extent of wireless signal reception range, and the stand can extend the extent of the reception area of the aerial circuit to a better signal reception position.

* * * * *